Nov. 7, 1950            F. L. VIBBER            2,529,320
FISHING LINE TENSION DETECTOR
Filed April 9, 1947
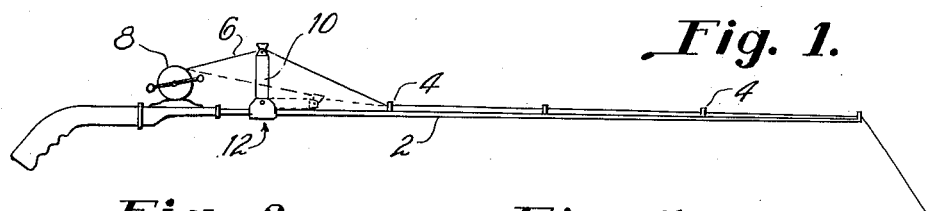
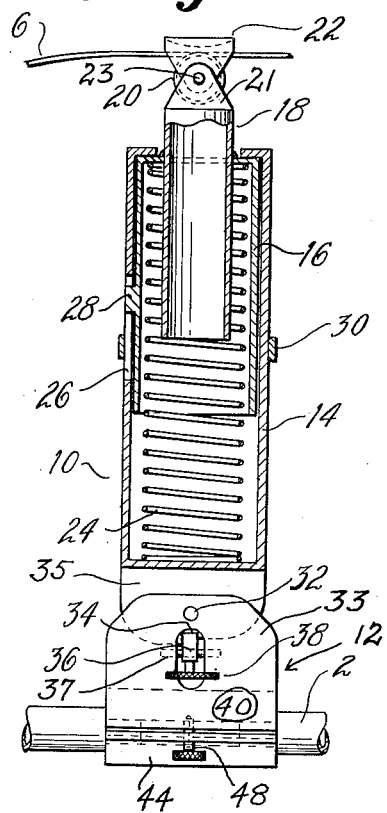
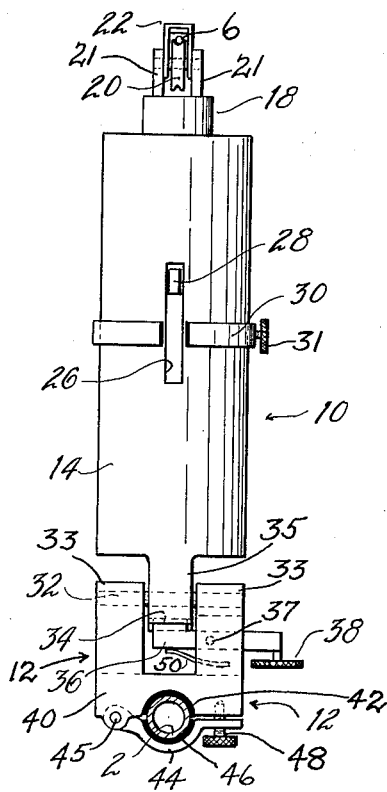
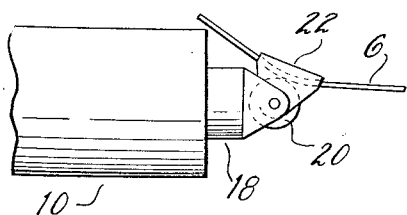
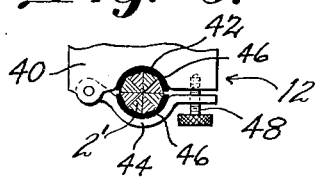
INVENTOR.
BY Foster L. Vibber
Alfred W. Vibber
his Attorney Patented Nov. 7, 1950

2,529,320

UNITED STATES PATENT OFFICE 2,529,320

FISHING LINE TENSION DETECTOR

Foster L. Vibber, Shrewsbury, Mass.

Application April 9, 1947, Serial No. 740,435

6 Claims. (Cl. 73—144)

This invention relates to devices for detecting the amount of tension in a fishing line, and also to the combination of such fishing line tension detector, a fishing line, and a line gathering means such as found, for example, in the conventional fishing rod provided with a reel.

The invention has among its objects the provision of a simple, rugged, tension detector for use with a fishing line.

Another object of the invention is the provision of a tension detector in the form of an attachment for a fishing rod.

Yet another object of the invention resides in the novel combination of a fishing apparatus including a fishing line and line gathering means with a selectively operable line tension detecting means.

In the preferred embodiment, the structure of the detector body, the means whereby it is attached to the rod, and the line engaging and guiding means on the detector are such that the device may be readily positioned in operative and inoperative positions without interfering with the function of the line gathering means.

These and further objects of the invention will be readily apparent in the description of the preferred embodiments of the fishing line tension detector and of the combination of such detector with a fishing rod provided with a reel, shown in the accompanying drawings in which:

Figure 1 is a view in side elevation of a fishing rod having a reel thereon, said pole being provided with a tension detector made in accordance with the invention;

Figure 2 is an enlarged view of the portion of the fishing rod on which the tension detector is mounted, the detector being shown partially in vertical section and partially in side elevation;

Figure 3 is a view of the detector in rear elevation, the fishing rod upon which it is clamped being shown in section;

Figure 4 is a fragmentary view in side elevation of that portion of the tension detector carrying the line engaging and guiding means, the detector being shown in recumbent, inoperative, position; and Figure 5 is a fragmentary view of the lower fishing rod engaging portion of the detector, such portion being shown engaging a fishing rod of octagonal cross section.

In Figure 1 there is shown a conventional fishing rod 2 provided with a plurality of line guides 4 along its length for guiding the fishing line 6 from the tip of the rod to the reel 8. The fishing line tension detector means, designated generally by the reference character 10, is preferably located at a point substantially intermediate the reel 8 and the lowest or first guide 4, the reel and the first guide functioning as the necessary line guiding means between which the tension detector operates. In such position, the detector is within easy reach and reading distance of the fisherman. It is to be understood, however, that the device may, if desired, be placed between any two adjacent line guiding devices in such position that it diverts or deflects the line from its normal course between such guides into a salient path of travel. The detector 10 is provided with a clamping means 12 by which it is attached to the fishing rod, the connection between means 10 and 12 being such that the detector may be positioned in an upright, operative, position as shown in full lines in Figure 1, or in a recumbent or horizontal, inoperative, position as shown in dotted lines in Figure 1. In the latter case, the fishing rod and reel are used as they would be if the tension detector were not present.

The construction of the detector, the means whereby it is clamped to a support such as a fish rod, and the connection between the detector and its support or clamp will be more readily appreciated by a consideration of Figures 2 and 3. In its preferred embodiment, the detector consists of an outer cylindrical casing 14 having a closed horizontal bottom and a horizontal inturned flange at its upper end as shown. Within the casing 14 there is telescoped the inner cylindrical member 16, which has an open bottom end and a flanged upper end which in no-load position engages the upper flanged end of casing 14. Attached to member 16, as by soldering or welding, in coaxial relationship therewith, is the upstanding smaller cylindrical body 18, the upper end of which projects a material distance above the top of casing 14. A helical spring 24 is positioned between the bottom end of outer casing member 14 and the flange at the upper end of member 16, the portion of inner body 18 projecting within member 16 functioning as a guide for such spring. Inner member 16 is provided with a horizontally projecting key-like member 28, which slides within the vertical slot 26 provided in the rear face of the outer casing member 14. Member 28 and slot 26 function to key the inner and outer members 16 and 14 together, and thus maintain them against relative rotation. Member 28 also functions as the movable indicating means of the tension detector.

The upper end of the inner upstanding member 18 is provided with a pair of upstanding parallel ears 21, through which is positioned the pintle pin 23 on which is journaled guiding pulley 20 and the line retaining member 22, which is in the form of an inverted U. As shown, the line 6 is led over pulley 20 and under the horizontal portion of member 22 which is preferably provided on its inner surface with a hard highly polished line guiding surface made, for example, of agate or porcelain.

The bottom of outer casing member 14 is provided with a central ear member 35 by which the detector is attached to the clamping means 12. Means 12 has a main body portion 40 having two spaced parallel upstanding ears 33, between which is received the ear 35. Pivot pin 32, extending through ears 33 and 35, allow the detector to be swung clockwise about the pivot pin in Figure 2, and into the plane of the paper in Figure 3. The detector is retained in its upright position, shown in Figures 2 and 3, by means of the detent 36 pivotedly mounted on one of the ears 33 by pivot pin 37. The inner upright edge of the detent, when the detector is in the position shown in Figures 2 and 3, fits within the notch 34 provided on the underface of ear 35. Leaf spring 59, having its inner end in contact with the underside of the detent at its inner end, the outer end of such spring being affixed in an opening in the right hand ear 33 (Figure 3), retains the detent in upward notch engaging position. When it is desired, however, to fold the tension detector downwardly into its inoperative position, it is necessary only to press upwardly on button 38 on the outer end of detent 36, whereby the detent is removed from the notch 34, and the detector is then free to be pivoted to inoperative position.

Means 12 is provided at its bottom with a clamping means engaging the fishing rod 2. Such means consists of a semi-cylindrical cavity 42 which runs lengthwise of body 40, and a jaw 44 having a mating semi-cylindrical recess therein, such jaw being pivoted to the body 40 by the pivot pin 45, and being retained in tight clamping position by means of the screw 48 extending loosely through the outer edge of the jaw and tapped into the body 40. In order to allow the clamping means to grip the fishing rod 2 firmly without injuring the latter, the cavity 42 and the mating cavity in the jaw 44 are preferably lined with a layer of elastomer 46. Such elastomer may be natural rubber or any of the so-called synthetic rubbers, such as, polychloroprene, butyl rubber, or the like. When the clamping members are so lined, the clamping pressure is distributed quite uniformly around the surface of the rod, so that the tension detecting means may be firmly retained in the desired position without crushing or otherwise injuring the rod.

It will be apparent that such a construction of the clamp may also be employed with rods having cross sections other than circular. Thus, in Figure 5 the rod 2' is of octagonal shape, being built up of eight pieces of wood of wedge cross section. When the clamp is employed on a rod of this shape, the elastomer lining members 46 yield sufficiently to conform to the shape of the rod, allowing the tension detector to be firmly retained thereon without crushing or otherwise injuring the rod.

When the tension detector is folded into its inoperative position, it diverts the fishing line 6 very little, if at all, from its normal course between the bottom, lowest, guide member 4 and the reel 8. Such path of travel of the line is shown in dotted lines in Figure 1. The actual course which the line takes under these circumstances depends, of course, upon the size of rod, reel, tension detector, and location of the latter between the reel and the guide 4. In most instances, however, when the tension detector is in inoperative position, the line 6 will run between guide pulley 20 and guide 22 generally in the manner shown in Figure 4.

When it is desired to ascertain the amount of tension in the line, the detector is swung upwardly to the position shown in Figures 2 and 3, where it is automatically retained by detent 36. Then, if the detector has been calibrated by testing it on a particular rod, the detector being mounted in the position in which it is to be used, calibration marks (not shown) will have been placed upon the barrel 14 along the edges of the slot 26, so that the device will yield a definite accurate reading of the amount of tension in the line. This falls, of course, from the fact that a definite force diagram is formed between the lowest guide 4, the reel, and the guide pulley 20 on the tension detector, so that a given movement downwardly of the pulley 20, and thus of indicator 28, represents a certain definite increase in tension in line 6.

Ordinarily, however, it is more convenient simply to attach the tension detector 10 to the fishing rod adjacent the reel in that position in which it causes a minimum of interference with the travel of the line from the bottom guide 4 to the reel when the detector is in inoperative position. Then the tension detector may be calibrated, as by stringing the rod with a short section of line extending through the guides and beyond the tip, tying or otherwise securing the end of such portion to a fixed object, and pulling until the line breaks, the position of indicator 28 at the time of breakage of the line being noted. Thereupon, the movable indicator in the form of the split ring 30, preferably having a width equal to that of indicator 28, may be moved down and clamped at such position by means of the thumb screw 31. Thereafter when he is fishing, with the tension detector in operative position, the fisherman will know, at any time, by noting the position of indicator 28 relative to member 30, how near his line is to the breaking point. This allows him to play a fish, which if pulled in directly would break the line, with the assurance that valuable line and tackle will not be lost.

For purposes of illustration I have shown and described preferred embodiments of the fishing line tension detector and the combination of such detector with fishing apparatus, specifically a rod and reel. It is to be understood, however, that the invention is not to be limited thereto, and being capable of considerable variation as to details, that it is defined by the scope of the following claims.

I claim as new the following:

1. In fishing apparatus, the combination of a fishing rod having a series of aligned fishing line guides thereon, a line gathering means, a fishing line attached thereto and extending through such guides, and means mounted on the fishing rod to measure the amount of tension in the line leading to the line gathering means, said tension detecting means comprising a main body portion including a relatively fixed part, a part movable relative thereto, and a resilient member between such fixed and movable parts, and a clamping means for attachment to a fishing rod pivotally connected to the main body portion, and means positioned between the clamping means and the main body portion of the tension detecting means for allowing selective positioning of the main body of the tension detecting means in upright line deflecting operative position or in recumbent inoperative position.

2. In fishing apparatus, the combination of a fishing rod having a reel thereon and at least one other line guiding means aligned therewith, a fishing line attached to the reel and extending through the line guiding means, and means mounted on the fishing rod adjacent the reel and between the reel and the line guiding means to measure the amount of tension in the line leading to the reel, said tension detecting means comprising a main body, such main body having a relatively fixed part and a relatively movable part resiliently connected to each other, a line engaging and guiding means mounted on the relatively movable part of the tension detector, clamping means, for attachment of the tension detecting means to the fishing rod, and means thereon for allowing the selective positioning of the main body of the tension detecting means in substantial right angular relationship to the rod or in recumbent inoperative position, the tension detecting means being so constructed and arranged that the line engaging and guiding means thereon causes the line to travel in a salient path between the guide and the reel on the fishing rod when the tension detecting means is in operative position.

3. A fishing line tension measuring means adapted for attachment to a fishing rod which comprises a main body portion adapted to be attached to the rod at substantially a right angle to the length of the rod, the upper end of such main body carrying a line engaging and deflecting means, the body including mechanism operated by the line deflecting means to measure the pressure thereon and thus the tension in the line, and means to clamp the lower end of the main body to a fishing rod, means pivotally connecting the main body to the clamping means for movement in the plane containing the fishing rod, and means selectively to lock the main body in upright position on the clamping means.

4. In fishing apparatus, the combination of a fishing rod having a series of aligned fishing line guides thereon, a line gathering means, a fishing line attached to the line gathering means and extending sequentially through such guides, and means mounted on the fishing rod to measure the amount of tension in the line leading to the line gathering means, said tension detecting means comprising a main body portion including a relatively fixed part, a part movable relative thereto for guiding the line and deflecting it into a salient path, a resilient member between such fixed and movable parts, and a clamping means attaching the tension detecting means to the fishing rod intermediate and immediately adjacent one of the fishing line guides and another line guiding means taken from the group consisting of the remaining fishing line guides and the line gathering means.

5. In fishing apparatus, the combination of a fishing rod having a series of aligned fishing line guides thereon, a line gathering means, a fishing line attached to the line gathering means and extending sequentially through such guides, and means mounted on the fishing rod to measure the amount of tension in the line leading to the line gathering means while allowing free movement of the line to and from the line gathering means, said tension detecting means comprising an elongated main body, such main body having a relatively fixed part and a relatively movable part resiliently connected to each other, a line engaging and guiding means mounted on the relatively movable part of the tension detecting means, and a clamping means attaching the tension detecting means to the fishing rod intermediate and immediately adjacent one of the fishing line guides and another line guiding means taken from the group consisting of the remaining fishing line guides and the line gathering means, the clamping means positioning the tension detecting means with its longitudinal axis approximately at right angles to the length of the fishing rod, the tension detecting means being so constructed and arranged that the line engaging and guiding means thereon causes the line to travel in a salient path thereover between the two line guiding means between which the tension detecting means is located.

6. In fishing apparatus, the combination of a fishing rod having a reel thereon and at least one other line guiding means aligned therewith, a fishing line attached to the reel and extending sequentially through the line guiding means, and means mounted on the fishing rod immediately adjacent the reel and immediately intermediate the reel and the line guiding means nearest the reel to measure the amount of tension in the line leading to the reel while allowing free movement of the line to and from the reel, said tension detecting means comprising an elongated main body, such main body having a relatively fixed part and a relatively movable part resiliently connected to each other, a line engaging and guiding means mounted on the relatively movable part of the tension detecting means, and clamping means attaching the tension detecting means to the fishing rod with the longitudinal axis of the main body of the tension detecting means extending at approximately right angles to the length of the fishing rod, the tension detecting means being so constructed and arranged that the line engaging and guiding means thereon causes the line to travel in a salient path thereover between the reel and the line guiding means immediately adjacent thereto.

FOSTER L. VIBBER.

REFERENCES CITED

The following references are of record in the file of this patent:

UNITED STATES PATENTS

| Number | Name | Date |
|---|---|---|
| 522,993 | Lobee | July 17, 1894 |
| 1,458,014 | Wailes | June 5, 1923 |
| 2,237,370 | Shekter | Apr. 8, 1941 |
| 2,284,364 | Breazeale | May 26, 1942 |
| 2,343,229 | Stone | Feb. 29, 1944 |